(12) United States Patent
Han et al.

(10) Patent No.: US 9,995,891 B2
(45) Date of Patent: Jun. 12, 2018

(54) OPTICAL MODULE AND OPTICAL TRANSCEIVER INCLUDING THE SAME

(71) Applicant: OE SOLUTIONS CO., LTD., Gwangju (KR)

(72) Inventors: Se Hee Han, Gwangju (KR); Eun Kyo Jung, Seoul (KR); Na Young Goh, Gwangju (KR); Tae Kyun Kim, Gwangju (KR)

(73) Assignee: OE SOLUTIONS CO., LTD., Gwangju (KR)

( * ) Notice: Subject to any disclaimer, the term of this patent is extended or adjusted under 35 U.S.C. 154(b) by 0 days. days.

(21) Appl. No.: 15/298,916

(22) Filed: Oct. 20, 2016

(65) Prior Publication Data

US 2018/0113261 A1 Apr. 26, 2018

(51) Int. Cl.
*G02B 6/36* (2006.01)
*G02B 6/42* (2006.01)
*H04B 10/40* (2013.01)

(52) U.S. Cl.
CPC ......... *G02B 6/4246* (2013.01); *G02B 6/4215* (2013.01); *G02B 6/4275* (2013.01); *G02B 6/4277* (2013.01); *G02B 6/421* (2013.01); *H04B 10/40* (2013.01)

(58) Field of Classification Search
CPC ... G02B 6/4275; G02B 6/4277; G02B 6/4246
USPC ........ 385/88, 89, 92–94; 398/139, 200, 201, 398/212, 214
See application file for complete search history.

(56) References Cited

U.S. PATENT DOCUMENTS

| 7,172,348 B2 * | 2/2007 | Yabe ................... G02B 6/4292 385/92 |
| 7,322,752 B2 * | 1/2008 | Endou .................. G02B 6/4206 385/88 |
| 2008/0124089 A1 * | 5/2008 | Ishigami ................ C25D 13/12 398/139 |
| 2010/0172617 A1 * | 7/2010 | Sato ........................ G02B 6/421 385/88 |
| 2012/0148257 A1 * | 6/2012 | Hwang .................. H04B 10/40 398/139 |
| 2013/0343711 A1 * | 12/2013 | Sano ..................... H01R 12/716 385/88 |
| 2015/0063762 A1 * | 3/2015 | Okada .................. G02B 6/4231 385/92 |

FOREIGN PATENT DOCUMENTS

JP 2001-66468 * 3/2001 ............... G02B 6/42

* cited by examiner

*Primary Examiner* — Robert Tavlykaev
(74) *Attorney, Agent, or Firm* — Ichthus International Law PLLC

(57) ABSTRACT

An optical module includes a case including an optical filter, a receptacle coupled to the case, an optical receiver, and an optical transmitter. The receptacle includes a recess formed along an outer circumferential surface thereof. The recess may be formed by a first side wall and a second side wall which face each other and a bottom surface coupling the first side wall to the second side wall. Further, at least one of the first side wall and the second side wall may include an insulating material.

8 Claims, 10 Drawing Sheets

OPTICAL MODULE AND OPTICAL TRANSCEIVER INCLUDING THE SAME

TECHNICAL FIELD

The present disclosure relates to an optical module and an optical transceiver including the same.

BACKGROUND

Generally, an optical transceiver module refers to a module or device in which various optical communication functions or components are accommodated in a single package that is modularized and connectable to an optical fiber. Recently, a bidirectional optical module, which is made by modularizing an optical transmitter and an optical receiver as a single module, is commonly used, wherein the optical transmitter uses a laser diode which consumes low power and is applicable in long distance transmission, and the optical receiver performs optical communication using a photodiode.

A bidirectional optical transceiver module basically includes an optical transmitter, an optical receiver, an optical filter, a receptacle, and the like. Also, an isolator may be included so as to prevent a characteristic of a laser diode from destabilizing due to reflection noise.

The receptacle serves as an optical coupling by an external optical fiber being inserted thereinto. The receptacle may be made of a metal material. Consequently, there may be a problem in that an electro static discharge (ESD) may flow through the receptacle and thus affect an element (for example, a laser diode of the optical transmitter) in the optical module.

Thus, there is a need for further improved technology relating to the receptacle in optical communications devices.

SUMMARY

The present disclosure provides an exemplary embodiment of a receptacle capable of blocking an electro static discharge (ESD) from an external side, and an optical module having the same.

In an aspect of the present disclosure, a receptacle is provided with enhanced coupling capability when in assembly, and an optical module having the same. As noted, in the existing technology, there may be a problem in that an electro static discharge (ESD) may flow through the receptacle and thus affect various elements including a laser diode of an optical transceiver in an optical module. Further, when an insulating material is disposed between a case of the optical transceiver and an optical subassembly (OSA), the ESD may come from a patch cord and flow through the OSA metal.

The problems to be solved by the present disclosure are not limited to those described above, and other problems not mentioned above should be clearly understood by those skilled in the art from the following description.

In an aspect, an exemplary embodiment of the receptacle is configured to connect an optical fiber from one end to an optical module, and the exemplary embodiment of the receptacle includes an insulating material between housings made of metal to prevent electrical effects, e.g., ESD, on the laser diode. Further, a mechanical connection is used for coupling the metal and the insulating material, e.g., a ring-type mechanical connection.

In an aspect of the present disclosure, an optical module is configured to include a case including an optical filter, a receptacle coupled to the case, an optical receiver, and an optical transmitter. The receptacle is configured to include a recess formed along an outer circumferential surface thereof, the recess being formed by a first side wall and a second side wall which face each other and a bottom surface coupling the first side wall to the second side wall, and at least one of the first side wall and the second side wall includes an insulating material.

In an aspect, the receptacle may include a first holder coupled to the case, a stub including an optical channel disposed inside the first holder, a second holder coupled to the first holder, and an insulating ring disposed between the first holder and the second holder.

In an aspect, insulating ring may be coupled between the first holder and the second holder and form the first side wall.

The second holder may include a first protrusion forming the second side wall of the recess.

In another aspect, the insulating ring may include a ring-shaped body having a first surface and a second surface, a plurality of first protrusions protruding as the first surface facing the first holder, a plurality of second protrusions protruding as the second surface facing the second holder, a first protruding bump formed at an outer circumferential surface of each of the plurality of first protrusions, and a second protruding bump formed at an outer circumferential surface of each of the plurality of second protrusions.

In an aspect, the first holder may include a first accommodating recess into which each of the first protrusions is disposed, and the first accommodating recess may include a first protruding step at which the first protruding bump is coupled.

In an aspect, the second holder may include a second accommodating recess into which each of the second protrusions is disposed, and the second accommodating recess may include a second protruding step at which the second protruding bump is coupled.

Each of the first protrusions may also include a first coupling protrusion extending in an axial direction, each of the second protrusions may include a second coupling protrusion extending in the axial direction, the first accommodating recess may include a first coupling recess to which the first coupling protrusion is coupled, and the second accommodating recess may include a second coupling recess to which the second coupling protrusion is coupled.

In another aspect, the first holder and the second holder may include a metal material, and the insulating ring may include a plastic material.

Still in another aspect, the receptacle may be disposed to face the optical transmitter, an optical filter may be disposed between the receptacle and the optical transmitter, the optical receiver may receive a first optical signal which is output from the receptacle and reflected by the optical filter, and the optical transmitter may output a second optical signal to the receptacle.

In another aspect of the present disclosure, an optical transceiver is provided. The optical transceiver according to one embodiment of the present disclosure includes an upper housing, a lower housing, and an optical module disposed between the upper housing and the lower housing. The optical module includes a case including an optical filter, a receptacle coupled to the case, an optical receiver, an optical transmitter. The receptacle includes a recess formed along an outer circumferential surface thereof and coupled to a protrusion formed at the lower housing, the recess is formed by a first side wall and a second side wall which face each other and a bottom surface coupling the first side wall to the second side wall, and at least one of the first side wall and the second side wall includes an insulating material.

The receptacle of the optical transceiver may include a first holder coupled to the case, a stub including an optical channel disposed inside the first holder, a second holder coupled to the first holder, and an insulating ring disposed between the first holder and the second holder.

BRIEF DESCRIPTION OF THE DRAWINGS

A more detailed understanding may be obtained from the following description in conjunction with the accompanying drawings.

DETAILED DESCRIPTION

The present disclosure may be modified in various forms and may have a variety of embodiments, and, therefore, specific embodiments thereof are shown by way of example in the drawings and will be provided in the following detailed description.

The embodiments to be disclosed below, therefore, are not to be taken to limit the scope of the present disclosure to specific embodiments, and should be construed to include modifications, equivalents, or substituents within the spirit and technical scope of the present disclosure.

It should be understood that the terms "comprise," "comprises," "comprising," "include," "includes," and/or "including" when used herein, specify the presence of stated features, integers, digits, steps, operations, components, elements, groups thereof, or a combination thereof unless clearly stated otherwise in the present specification, but do not preclude the presence or addition of one or more other features, integers, steps, operations, elements, components and/or groups thereof.

Also, it should be understood that enlarged or shrunk drawings shown in the present disclosure are illustrated for the purpose of the explanation.

With reference to the drawings, exemplary embodiments of the present disclosure will be described in detail below. To aid in understanding the present disclosure, like numbers refer to like elements throughout the description of the figures, and the description of the same elements will be omitted herein.

Figure 1:
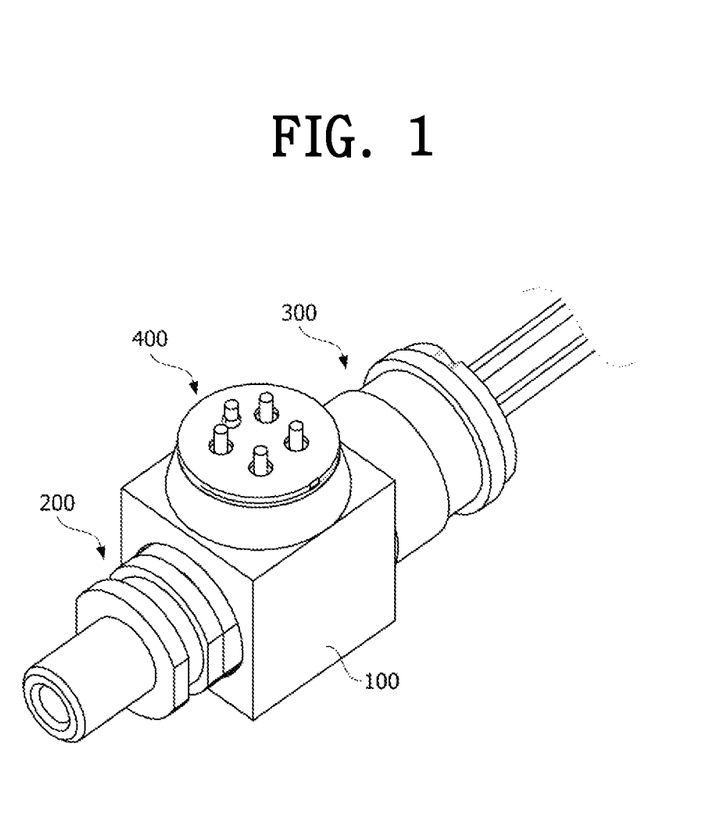
FIG. 1 is a perspective diagram of an example of an optical module according to one aspect of the present disclosure.
Figure 2:
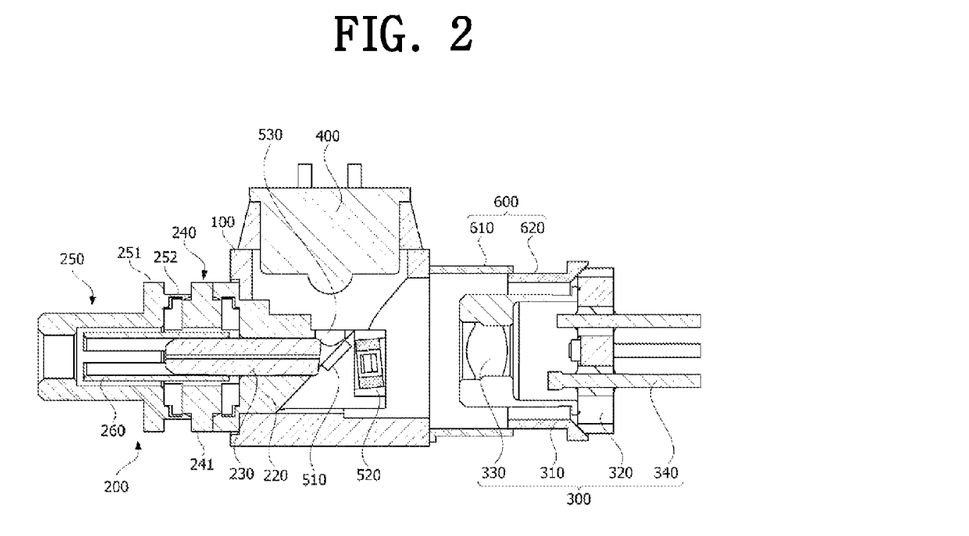
FIG. 2 is a cross-sectional diagram of an example of an optical module according to one aspect of the present disclosure.

FIG. 1 is a perspective diagram of an example of an optical module according to one aspect of the present disclosure, and FIG. 2 is a cross-sectional view of the example of the optical module according to one aspect of the present disclosure.

With reference to FIGS. 1 and 2, an optical module according to one aspect of the present disclosure includes a case 100, a receptacle 200 inserted into the case 100, an optical transmitter 300, and an optical receiver 400.

The case 100 includes a plurality of openings, e.g., openings into which the receptacle 200, the optical transmitter 300, and the optical receiver 400 are inserted or disposed. In particular, the receptacle 200 and the optical transmitter 300 may be disposed to face each other inside the case 100. In an aspect of the present disclosure, the optical receiver 400 may be disposed in a vertical direction with respect to a direction in which the optical transmitter 300 is inserted. However, the arrangement is not limited thereto, and different arrangements of the receptacle 200, the optical transmitter 300, and the optical receiver 400 may be possible.

In the example shown in FIGS. 1 and 2, the receptacle 200 is connected to an external connector to output a first optical signal, which is output from an external side, to a first optical filter 510. The receptacle 200 may include a first holder 220 coupled to the case 100, a stub 230 inserted into the first holder 220 and inside which an optical fiber is disposed, a sleeve 260 coupled to the stub 230, a second holder 250 coupled to the first holder 220, and an insulating ring 240 disposed between the first holder 220 and the second holder 250.

The optical transmitter 300 transmits a second optical signal to the external side through the optical fiber of the receptacle 200. The second optical signal has a wavelength different from that of the first optical signal that is output from the optical fiber. Further, a structure of a typical transistor-outline-can (TO-can) including a light source 310, a header (a stem) 320, and a lens 330 may be totally applicable to the optical transmitter 300.

The light source 310 may include a semiconductor light-emitting element, and be configured to convert an electrical signal into an optical signal for outputting the optical signal. In one implementation, a laser diode may be used as the light source 310. Because the laser diode consumes low power and has a narrow spectrum bandwidth to enable light of a high output power to be finely concentrated, the laser diode may be used as a light source for optical communications.

In an aspect of the present disclosure, the header 320 on which the light source 310 is seated is formed in a disc shape, and a plurality of connection pins 340 may be inserted through the header 320. The connection pins 340 may form electrical paths between the light source 310 and an external circuit board (not shown). As an example, a positive (+) signal, a negative (−) signal, and a ground signal may be output through each of the connection pins 340.

The lens 330 may be configured to concentrate the first optical signal output from the light source 310 and transmit it to the receptacle 200. The lens 330 may also be disposed at a location to optically couple to the optical fiber of the receptacle 200.

Further, in the example, a distance adjustment member 600 may include a first adjustment member 610 disposed at another side of the case 100, and a second adjustment member 620 inserted into and coupled to the first adjustment member 610. According to an insertion degree (or amount) between the second adjustment member 620 and the first adjustment member 610, a distance that the second signal, which is output from the optical transmitter 300, reaches in the optical fiber may be adjusted. As such, according to an insertion degree between the second adjustment member 620 and the first adjustment member 610, an output of the optical transmitter 300 may be adjusted. The optical transmitter 300 may be inserted into and coupled to one side of the second adjustment member 620.

The first adjustment member 610 and the second adjustment member 620 are made of a hollow cylinder shape and are formed to have diameters different from each other. In an aspect of the present disclosure, the second adjustment member 620 is inserted at a location of the first adjustment member 610, and is then coupled thereto through welding or the like, for example. At this point, the location may indicate a location at which the second optical signal is adjusted to a required output level.

The optical receiver 400 may include a photo diode and be configured to convert an optical signal received from the external side through the optical fiber into an electrical signal. When an optical signal is incident on a photo diode, a reverse current, in proportion to an amount of incident light, is configured to flow. In other words, the optical receiver 400 may be configured to vary an output current according to the amount of incident light to convert the optical signal into an electrical signal.

The first optical filter 510 may be disposed between the optical transmitter 300 and the receptacle 200, and may pass an optical signal transmitted from the optical transmitter 300 and transmit it to the optical fiber of the receptacle 200.

In one implementation, the first optical filter 510 may be designed to pass only an optical signal of a predetermined wavelength. For example, the first optical filter 510 may pass the second optical signal output from the optical transmitter 300 and reflect the first optical signal output through the optical fiber of the receptacle 200 from the external side. In another aspect of the present disclosure, the first optical filter 510 may be configured with a 45-degree filter to reflect the first optical signal in a direction perpendicular to an incident direction. Further, an arrangement and a reflection angle of the first optical filter 510 may vary and not be limited thereto.

A second optical filter 530 may be disposed and configured to pass the first optical signal reflected by the first optical filter 510. The first optical signal passing through the second optical filter 530 may be transmitted to the optical receiver 400 and be converted into an electrical signal by the optical receiver 400.

In an aspect of the present disclosure, the second optical filter 530 may be disposed to face the first optical filter 510 or may be configured with a zero-degree filter so as to pass the optical signal that is reflected by the first optical filter in a perpendicular direction.

An isolator 520 may be used to block an optical signal received by and being reflected by an optical component provided inside the optical fiber or the optical module. The isolator 520 may include a polarizer passing only an optical signal of a predetermined polarized light component, an analyzer, and a Faraday rotator rotating an optical signal input therein by an angle, for example, 45 degrees, of linear polarization.

Figure 3:
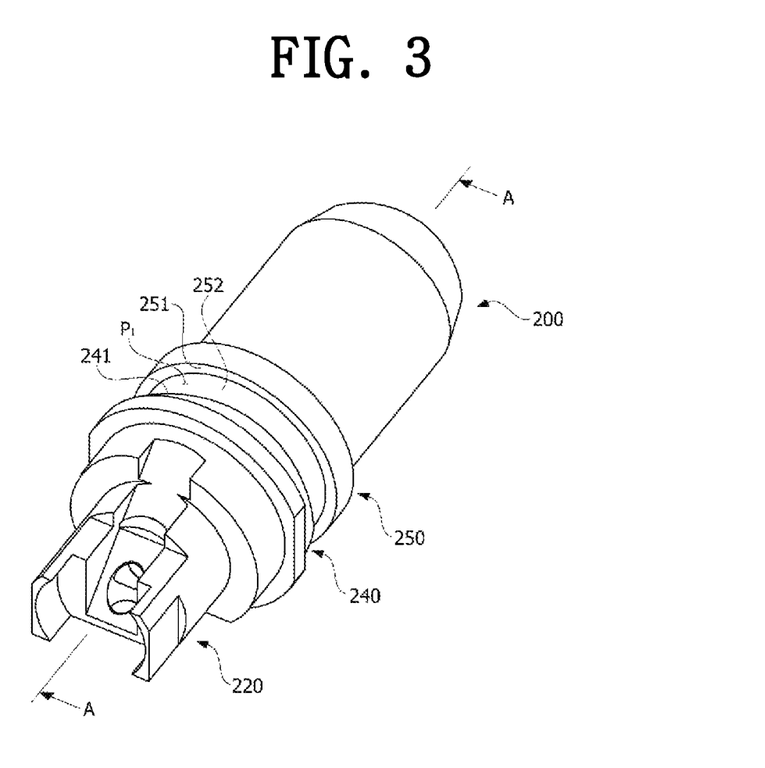
FIG. 3 is a perspective diagram of an example of a receptacle according to one aspect of the present disclosure.
Figure 4:
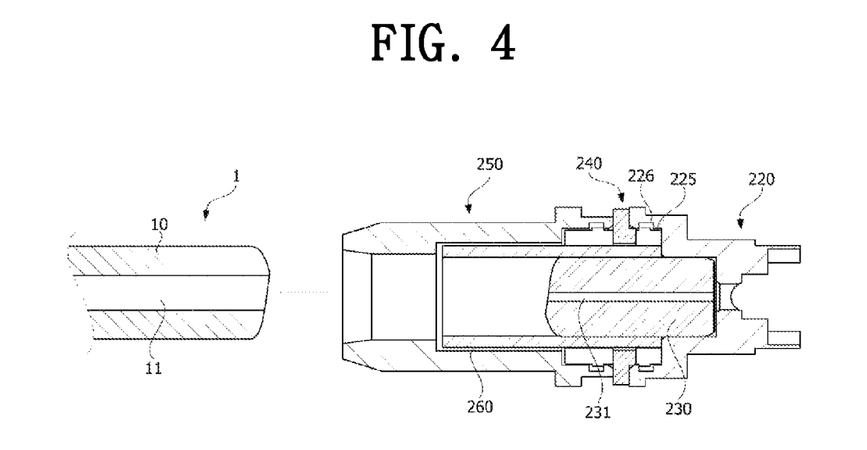
FIG. 4 is a diagram illustrating a state in which an example of an external optical fiber is inserted into the receptacle in accordance with an aspect of the present disclosure.
Figure 5:
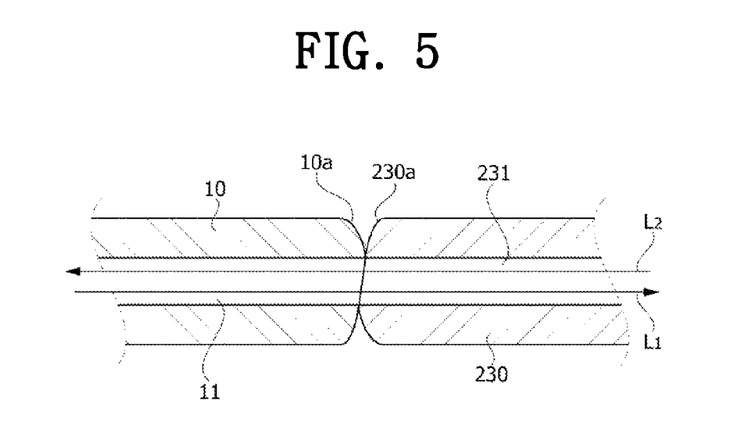
FIG. 5 is a diagram illustrating an optical coupling between the external optical fiber and the receptacle according to one aspect of the present disclosure.

FIG. 3 is a perspective diagram of a receptacle according to one embodiment of the present disclosure, FIG. 4 is a diagram illustrating a state in which an external optical fiber is being inserted into the receptacle according to one embodiment of the present disclosure, and FIG. 5 is a diagram illustrating an optical coupling between the external optical fiber and the receptacle according to one embodiment of the present disclosure.

With reference to FIG. 3, the receptacle 200 may include a coupling recess P1 which is formed along an outer circumferential surface of the receptacle 200. In particular, the coupling recess P1 may be formed by a first side wall 241 and a second side wall 251 which face each other and a bottom surface 252 that couples the first side wall 241 to the second side wall 251. In an aspect of the present disclosure, at least one of the first side wall 241 and the second side wall 251 may include an insulating material such that an electro static discharge (ESD) input from the second holder 250 may not propagate into the first holder 220. By way of an example, the first side wall 241 of the coupling recess P1 adjacent to the first holder 220 may include an insulating material. In such a configuration, even though an ESD flows through the bottom surface 252, the ESD does not propagate in a direction of the first holder 220.

With reference to FIGS. 4 and 5, an optical fiber 231 may be disposed inside the stub 230. A space accommodating an external connector 1 is formed inside the second holder 250 in such a way that the external connector 1 may be freely coupled (or attached) to or decoupled (or detached) from the receptacle 200.

As shown in FIG. 5, the stub 230 may include an inclined surface. One inclined surface 10a of a ferrule 10 of the external connector 1 may contact an inclined surface 230a. With such a configuration, a first optical signal L2 may be incident on the first holder 220 through the external connector 1, and the first optical signal L2 output from the optical transmitter 300 may be transmitted to an external side through the external connector 1.

In the example, the inclined surface 230a of the stub 230 and the inclined surface 10a of the ferrule 10 may be coupled to each other in an inclined state, thereby reducing refraction and reflection of light. In the example, an optical coupling of such a type may be an angled physical contact (APC) type, but an optical coupling structure may not be limited thereto.

Figure 6:
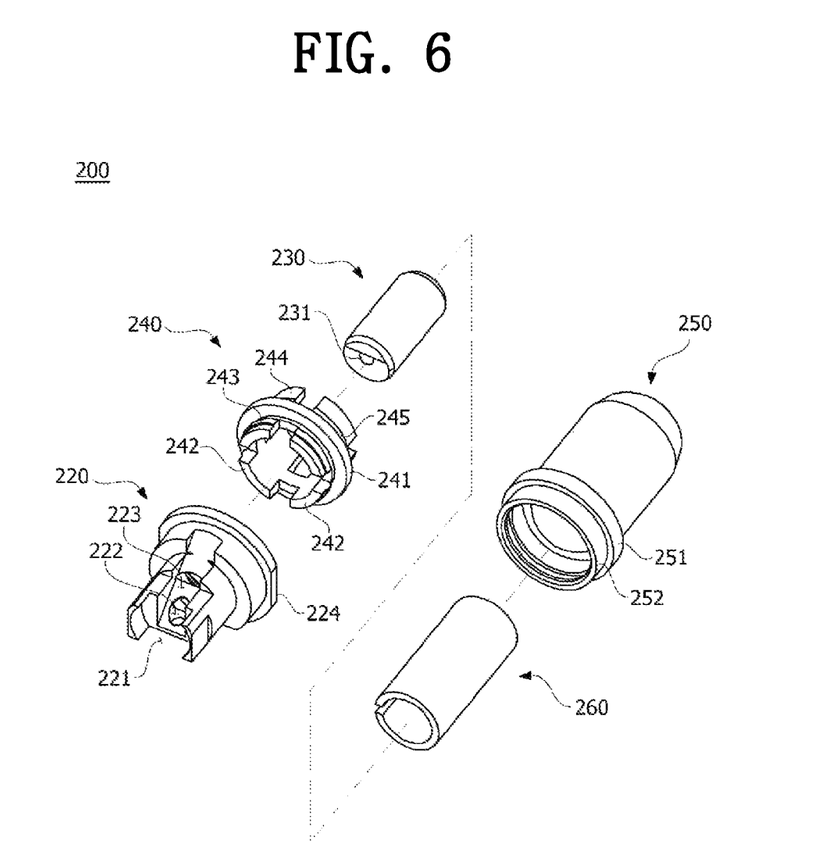
FIG. 6 is an exploded perspective diagram of an example of the receptacle according to one aspect of the present disclosure.
Figure 7:
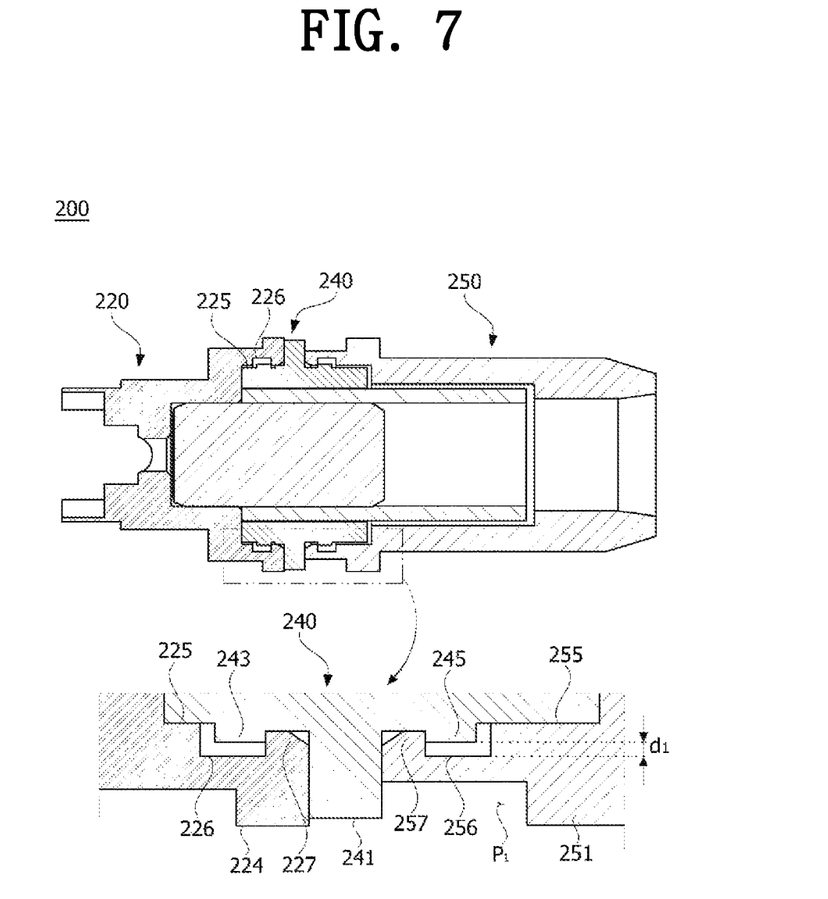
FIG. 7 is a cross-sectional diagram of an example of the receptacle according to one aspect of the present disclosure.

FIG. 6 is an exploded perspective diagram of the receptacle 200 according to an aspect of the present disclosure, and FIG. 7 is a cross-sectional diagram of the receptacle 200 according to an aspect of the present disclosure.

In the example shown in FIGS. 6 and 7, the receptacle 200 may include the first holder 220, the stub 230 including an optical channel 231 disposed inside the first holder 220, the second holder 250 coupled to the first holder 220, and the insulating ring 240 disposed between the first holder 220 and the second holder 250.

Further, the receptacle 200 further includes an isolator accommodation unit 221 at an end of the first holder 220, an arrangement surface 223 for the first optical filter 510, and an opening hole 222 may be formed at the first holder 220. The first holder 220 may include a ring-shaped protrusion 224 which is configured to protrude in a circumferential direction.

In an aspect of the present disclosure, the insulating ring 240 is configured to couple the first holder 220 and the second holder 250 to form a first side wall of a coupling recess. The insulating ring 240 may further include a ring-shaped body 241, a plurality of first protrusions 242 that are configured to protrude as one surface facing the first holder 220, and a plurality of second protrusions 244 that are configured to protrude as the other surface facing the second holder 250. Also, in another aspect of the present disclosure, the insulating ring 240 may be made of any insulating material, for example, a plastic material, but is not limited thereto as long as it is made of a material which can provide electrical insulation.

As shown in FIGS. 6 and 7, the plurality of first protrusions 242 of the insulating ring 240 may be inserted into a first accommodating recess 225 of the first holder 220. Also, the plurality of second protrusions 244 of the insulating ring 240 may be inserted into a second accommodating recess 255 of the second holder 250.

A first protruding bump 243 may be formed on a circumferential surface of each of the plurality of first protrusions 242 of the insulating ring 240. Further, the first protruding bump 243 may be elastically coupled to a first protruding step 226 formed at the first accommodating recess 225 of the first holder 220. That is, the first protruding bump 243 may be flexible enough (e.g., to bend) to couple to a hook 227 of the first protruding step 226 which is made of metal.

A second protruding bump 245 may be formed on a circumferential surface of each of the plurality of second protrusions 244. The second protruding bump 245 may be elastically coupled to a second protruding step 256 formed at the second accommodating recess 255 of the second holder 250. That is, the second protruding bump 245 may be flexible enough (e.g., to bend) to couple to a hook 257 of the second protruding step 256 which is made of metal.

It is also noted that use of the hook 227 of the first protruding step 226 and the hook 257 of the second protruding step 256 may enable easy assembly and connection in a cost effective way, compared to the existing technology (e.g., press-fitting technology). That is, since the connection between the metal parts and the insulating material (e.g., the insulating ring 240) is made via a protruding part (e.g., hooks), the assembly process may be made easy and simple. Further, the present technology disclosed herein may reduce the unit cost of assembly and defect rates as well as reduces assembly and process times, thereby providing many benefits over the existing technology in which the press-fitting technology is used or a glue such as epoxy is used for coupling purposes.

In such a configuration, the first holder 220 and the second holder 250 may be elastically coupled to the insulating ring 240 and be simply assembled with each other. Also, after being coupled, they may not be separated from each other. In addition, such a structure may provide tolerance to be easily managed and improve ease of assembly in comparison with a method in which the first holder 220 and the second holder 250 are pressed and inserted into each other to be coupled.

In one implementation, a height at which the first protruding bump 243 and the hook 227 of the first protruding step 226 come into contact with each other may be approximately in a range of 0.02 mm to 0.03 mm. In this case, after being elastically coupled to each other, the first holder 220 and the insulating ring 240 may not be easily separated from each other by an external force. A height at which the second protruding bump 245 and the hook 257 of the second protruding step 256 come into contact with each other may be substantially the same as the height described above.

Further, in the example shown in FIG. 7, a predetermined gap dl may be formed between the first protrusion bump 243 and the first protruding step 226, and between the second protrusion bump 245 and the second protruding step 256. In an aspect of the present disclosure, the insulating ring 240 may be made of a plastic material to have a thermal expansion coefficient higher than that of each of the first holder 220 and the second holder 250, which are made of metal. As such, the gap dl may also be used as a space for accommodating an expansion of the insulating ring 240.

Figure 8:
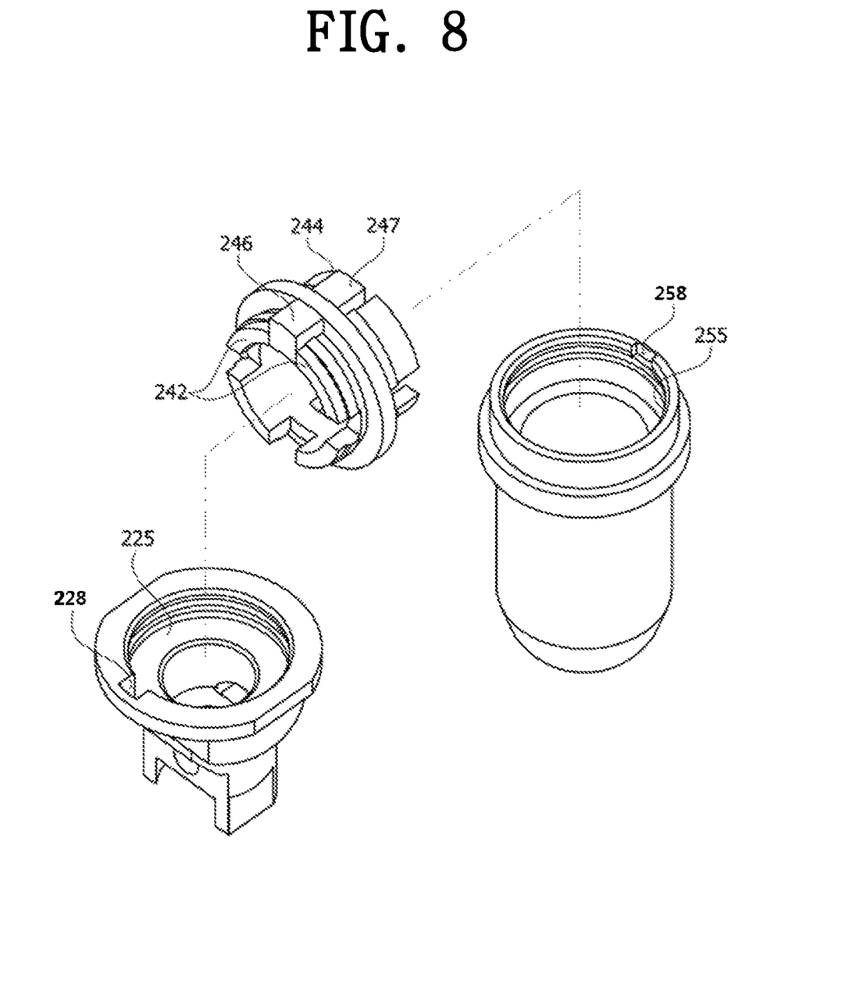
FIG. 8 is a modified example of the receptacle.

FIG. 8 is an example of the receptacle 200 in accordance with another aspect of the present disclosure.

In the example shown in FIG. 8, the insulating ring 240 may include a first coupling protrusion 246 disposed between the plurality of first protrusions 242 and protruding in an axial direction. The first coupling protrusion 246 of the insulating ring 240 may be accommodated (or mated) in a first coupling recess 228 formed at an inner circumferential surface of the first holder 220. With such a structure, the first holder 220 and the insulating ring 240 may be securely coupled to each other.

With the same structure described above, a second coupling protrusion 247 may be disposed between the plurality of second protrusions 244 and configured to protrude in an axial direction. The second coupling protrusion 247 may be accommodated (or mated) in a second coupling recess 258 formed at an inner circumferential surface of the second holder 250. With such a structure, the first holder 220 and the second holder 250 may not rotate relative to each other, thereby improving reliability of an optical coupling. In particular, it may be useful in an APC type in which an optical fiber disposed inside a stub and an external optical fiber may be coupled to each other in an inclined state.

Figure 9:
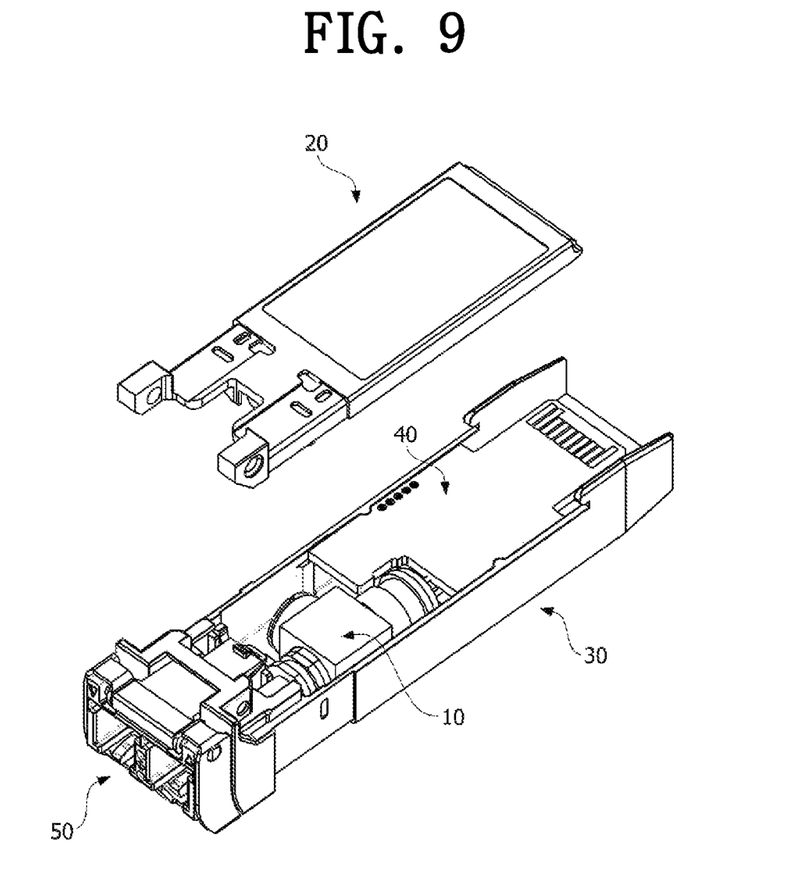
FIG. 9 is a perspective diagram of an example of an optical transceiver according to one aspect of the present disclosure.
Figure 10:
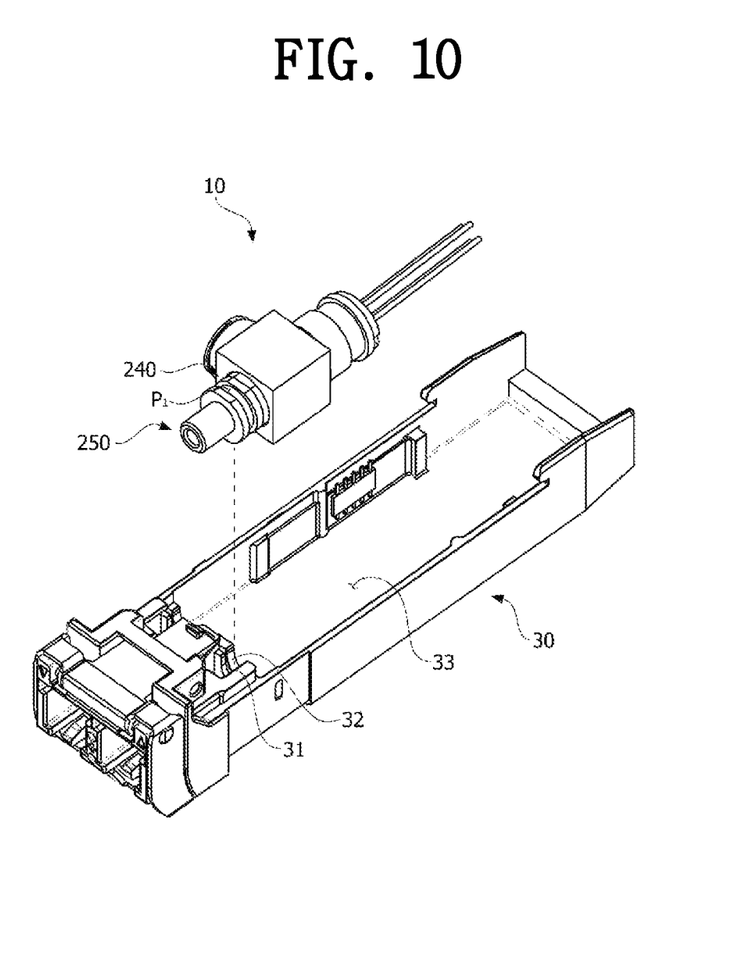
FIG. 10 is a diagram for describing a coupling state between a lower housing and an optical module.
Figure 11:
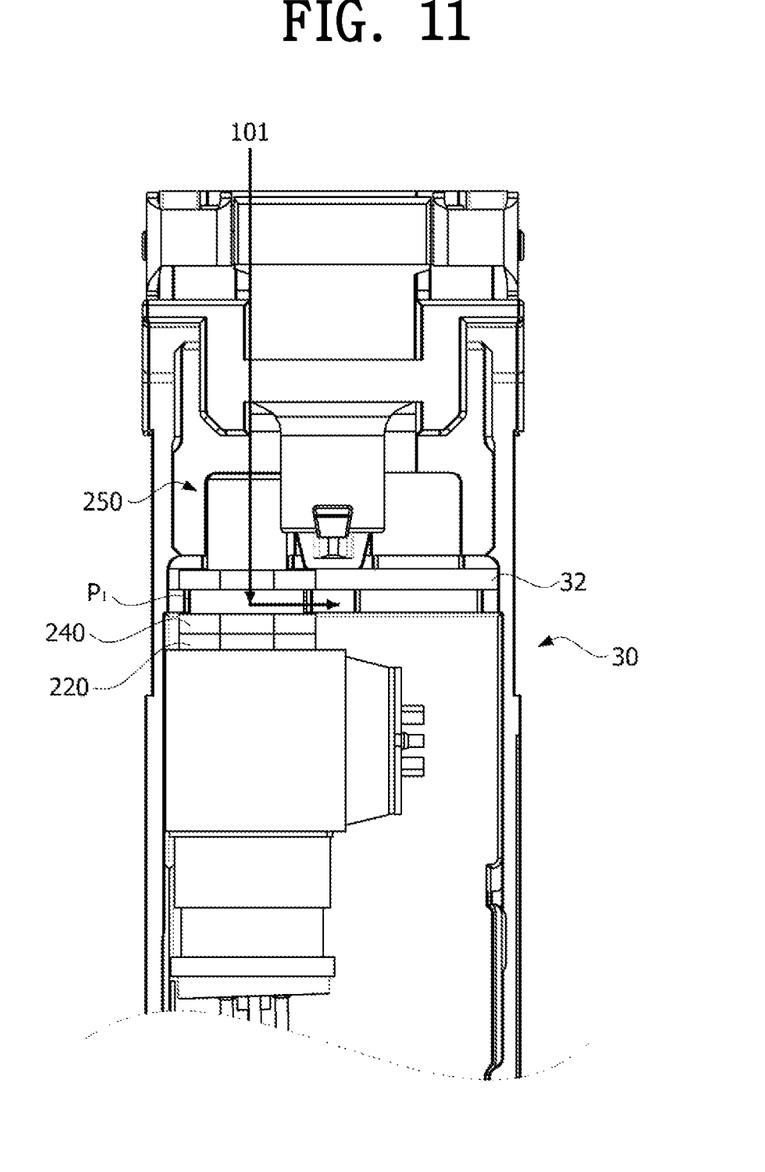
FIG. 11 is a diagram showing a state in which an electro static discharge (ESD) is blocked by an insulating ring of the receptacle.

FIG. 9 is a perspective diagram of an example of an optical transceiver in accordance with an aspect of the present disclosure. FIG. 10 is a diagram for illustrating a coupling state between a lower housing 30 and an optical module 10. FIG. 11 is a diagram illustrating a state in which an ESD is blocked by an insulating ring 240 of the receptacle 200.

With reference to FIG. 9, in an aspect of the present disclosure, an optical transceiver may include an upper housing 20, a lower housing 30, at least one optical module 10, a circuit board electrically connected to the optical module 10, and an optical interface 50. The optical interface 50 may include a connector to which a ferrule of an external connector may be inserted to be optically connected thereto.

The optical transceiver may be a small form factor pluggable (SFP) type, but is not limited thereto, and it may be a variety of types of transceiver satisfying a multiple source agreement (MSA).

With reference to FIGS. 10 and 11, a fixing bump 32 by which a coupling recess P1 of the optical module 10 may be fixed may be provided at the lower housing 30. When the upper and lower housings 20 and 30 and the optical module 10 are made of a metal material, an ESD flowing through the upper housing 20 or the lower housing 30 may affect elements of the optical module 10.

Also, in a case of an insulation structure in which a separate insulating fabrication is installed between the optical module 10 and the housings 20 and 30, it may be difficult to shield against an ESD flowing through the receptacle 200 that is made of a metal material. For example, when an instantaneous high voltage (i.e., an ESD of about 8 kV) is applied to a laser diode that is not provided with a separate ground, the laser diode may not endure the instantaneous high voltage and a circuit loss may occur, causing an abnormal operation of the transceiver.

However, in an aspect of the present disclosure, and as shown in FIG. 11, an ESD 101 flowing from the external side may not pass through the insulating ring 240 and thus the ESD 101 is directed to flow to a fixing bump 32 of the lower housing 30 at which the second holder 250 is disposed, instead of flowing through to the first holder 220. That is, the upper and lower housings 20 and 30 may serve as a chassis ground. As a result, a stable operation of the transceiver may be possible.

As such, an ESD applied to the optical module through the receptacle may be blocked.

Also, in an aspect of the present disclosure, assembling receptacle components may be simplified and a coupling ability thereof may be enhanced.

The advantages and effects of the present disclosure may not be limited to the above, and they may be more easily understood by a skilled artisan in view of the detailed embodiments of the present disclosure.

In the present disclosure, particular combinations of features are disclosed in the specification and/or recited in the claims, but these combinations are not intended to limit the disclosure of the present technology. Further, the methods or methodologies for the present technology disclosed therein may be implemented in any sequence.

The term "unit" or "component" as used herein means software, hardware, or any combinations thereof. A unit may be implemented as a software component, a hardware component, or any combinations thereof, including a field programmable gate array (FPGA), logic, logic arrays, application specific integrated circuit (ASIC), digital signal processor (DSP), microcontroller, microprocessor, etc. or any combination thereof. The unit thus may include firmware, micro-codes, circuits, data structures, tables, arrays and variables.

Further, while for the purpose of simplicity, the methods and/or methodologies are described herein as a series of steps or acts, the claimed subject matter is to be understood as being not limited by the order of the steps or acts. Some steps or acts may occur in different orders and/or concurrently with other acts from that shown and described herein. Further, not all illustrated steps or acts may be required to implement various methodologies described herein. Also, the methodologies disclosed herein and throughout the specification are capable of being stored on an article of manufacture to facilitate transporting and transferring such methodologies to one or more processing systems. The term "article of manufacture" is intended to encompass a computer program accessible from any computer-readable device, carrier, or medium.

In the present disclosure, a singular form may include a plural form if there is no clearly opposite meaning in the context. Also, as used therein, the article "a" is intended to include one or more items. Further, no element, act, step, or instruction used in the present disclosure should be construed as critical or essential to the present disclosure unless explicitly described as such in the present disclosure.

The terms "first," "second," and so forth used herein may also be used to describe various components, but the components are not limited by the above terms. The above terms are used only to discriminate one component from other components, without departing from the scope of the present disclosure. Also, the term "and/or" as used herein includes a combination of a plurality of items or any item of the plurality of the items. Further, when an element is described to be "coupled" or "connected" to another element, the element may be directly coupled or directly connected to the other element, or the element may be coupled or connected to the other element through a third element. Further, the term "include" or "have" as used herein indicates that a feature, an operation, a component, a step, a number, a part or any combination thereof described therein is present, and the above terms do not exclude a possibility of presence or addition of one or more other features, operations, components, steps, numbers, parts or combinations.

As noted herein, the present technology has been illustrated with specific examples described herein for the purpose of illustrations only, and thus one skilled in the art may appreciate that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. An optical module comprising:
a case including an optical filter; and
a receptacle coupled to the case,
wherein the receptacle includes:
a first holder coupled to the case, the first holder comprising a first ring-shaped protrusion including a first protruding step with a first hook;
a stub including an optical channel, the stub being disposed inside the first holder;
a second holder comprising a second ring-shaped protrusion including a second protruding step with a second hook; and
an insulation ring disposed between the first holder and the second holder and coupling the first holder and the second holder,
wherein the insulation ring includes:
a first holder portion configured to be inserted in the first holder;
a second holder portion configured to be inserted in the second holder; and
a ring-shaped body comprising a protrusion in an outward direction, the protrusion coupled to the first holder portion and the second holder portion, and the protrusion being configured to separate the first holder and the second holder when the insulation ring is coupled to the first holder and the second holder,
wherein the first holder portion includes a plurality of first protruding bumps formed on a circumferential surface of the first holder portion and disposed on one side of the protrusion of the ring-shaped body, the first protruding bumps facing in the outward direction,
wherein the second holder portion includes a plurality of second protruding bumps formed on a circumferential surface of the second holder portion and disposed on the other side of the protrusion of the ring-shaped body, the second protruding bumps facing in the outward direction, and
wherein the plurality of first protruding bumps of the first holder portion of the insulation ring is configured to couple to the first hook of the first protruding step of the first holder, and the plurality of second protruding bumps of the second holder portion of the insulation ring is configured to couple to the second hook of the second protruding step of the second holder, when the insulation ring is disposed between the first holder and the second holder.

2. The optical module of claim 1, wherein the second holder includes a first protrusion forming a second side wall of a recess.

3. The optical module of claim 1, wherein the first holder further includes a first accommodating recess formed by the first protruding step of the first holder, and wherein when the insulation ring is coupled to the first holder, the plurality of first protruding bumps of the insulation ring is disposed in the first accommodating recess of the first holder.

4. The optical module of claim 3, wherein the second holder includes a second accommodating recess formed by the second protruding step of the second holder and wherein when the insulation ring is coupled to the second holder, the plurality of second protruding bumps of the insulation ring is disposed in the second accommodating recess of the second holder.

5. The optical module of claim 1, wherein the first holder and the second holder each include a metal material, and the insulation ring includes a plastic material.

6. The optical module of claim 1, wherein the plurality of first protruding bumps and the plurality of second protruding bumps of the insulation ring are flexible in such a way that the first holder and the second holder are elastically coupled to the insulation ring.

7. An optical transceiver comprising:
an upper housing;
a lower housing; and
an optical module disposed between the upper housing and the lower housing,
wherein the optical module includes:
a case including an optical filter; and
a receptacle coupled to the case,
wherein the receptacle includes:
a first holder coupled to the case, the first holder comprising a first ring-shaped protrusion including a first protruding step with a first hook,
a stub including an optical channel, the stub being disposed inside the first holder,
a second holder comprising a second ring-shaped protrusion including a second protruding step with a second hook; and
an insulation ring disposed between the first holder and the second holder and coupling the first holder and the second holder, wherein the insulation ring includes:
a first holder portion configured to be inserted in the first holder;
a second holder portion configured to be inserted in the second holder; and
a ring-shaped body comprising a protrusion in an outward direction, the protrusion coupled to the first holder portion and the second holder portion, and the protrusion being configured to separate the first holder and the second holder when the insulation ring is coupled to the first holder and the second holder,
wherein the first holder portion includes a plurality of first protruding bumps formed on a surface of the first holder portion and disposed on one side of the protrusion of the ring-shaped body, the first protruding bumps facing in the outward direction,
wherein the second holder portion includes a plurality of second protruding bumps formed on a surface of the second holder portion and disposed on the other side of the protrusion of the ring-shaped body, the second protruding bumps facing in the outward direction, and
wherein the plurality of first protruding bumps of the first holder portion of the insulation ring is configured to couple to the first hook of the first protruding step of the first holder, and the plurality of second protruding bumps of the second holder portion of the insulation ring is configured to couple to the second hook of the second protruding step of the second holder, when the insulation ring is disposed between the first holder and the second holder.

8. The optical transceiver of claim 7, wherein the plurality of first protruding bumps and the plurality of second protruding bumps of the insulation ring are flexible in such a way that the first holder and the second holder are elastically coupled to the insulation ring.

\* \* \* \* \*